Patented Apr. 24, 1934

1,955,840

UNITED STATES PATENT OFFICE 1,955,840

METHOD OF COATING OR IMPREGNATING FABRIC WITH RUBBER

Geoffrey William Trobridge, Sutton Coldfield, England, assignor to Dunlop Rubber Company Limited, Birmingham, England, a British corporation No Drawing. Application September 6, 1929, Serial No. 390,861. In Great Britain October 25, 1928

1 Claim. (Cl. 91—68)

This invention consists in an improved process for the impregnating and/or coating of fabric with rubber from aqueous dispersions of the kinds hereinafter specified.

According to the process of this invention a mould or former of porous or non-porous character such as of glass, metal or porcelain containing perforations and provided with a covering or coating of porous material such as fabric and/or gypsum is covered with fabric and this fabric is wetted with a volatile coagulating and/or dehydrating agent prior to dipping the fabric into a concentrated and/or compounded aqueous dispersion containing rubber, or alternatively fabric treated in the aforementioned manner is caused to pass over a length of a stationary or a travelling band such as metal partially immersed in such concentrated and/or compounded aqueous dispersion, the complete setting or final setting of the deposit being effected after removal of the coated fabric by the aid of a setting or coagulating means, as for example, by heat, by dehydrating and setting solutions as described and claimed in Patent No. 1,887,190 of November 8, 1932, or by acid coagulating solutions such as acetic acid solution.

The concentrated dispersions of rubber or the like vegetable resins may be compounded, preserved, natural or artificial, vulcanized, or unvulcanized. Such dispersions may also contain such added substances as factice, rubber waste, rubber reclaim, mineral rubber or synthetic rubber, vulcanizing agents, accelerators, additional preservatives, dyes and filling materials. Such dispersions may also have admixed therein such artificial resins as phenol-aldehyde, protein-aldehyde and/or urea-aldehyde condensation products.

It has been found that concentrated compounded dispersions obtained according to the process described and claimed in United States Patent No. 1,846,146 of February 23, 1932, are particularly suitable for the purpose of this invention.

A suitable mix in the form of aqueous dispersion contains the following ingredients:—

| | |
|---|---|
| Rubber as latex | 100 |
| Sulphur | 2 |
| Transformer oil | 5 |
| Zinc diethyldithiocarbamate | 1 |

The water content of the mixture is approximately 40% and the alkalinity approximately 0.05 grams ammonia per 100 cc.

In one embodiment of carrying the invention into effect a metal former, as for example, of the shape of a glove is covered with a well fitting fabric glove such as of ordinary or mercerized cotton or of natural or artificial silk. The fabric is wetted with a volatile coagulant and/or dehydrating agent, as acetone, alcohol, formaldehyde or formic acid solution. In this manner not only can thicker deposits be obtained than without the use of the volatile coagulating and/or dehydrating agents mentioned, but the article has also a smoother outer surface of rubber and the side of the fabric removed from the rubber deposit is in no way contaminated with any rubber passing through the fabric.

The rubber coated fabric is dried and vulcanized in the usual manner and subsequently stripped from the former. If a thicker coating is desired, however, the fabric covered former before the drying and vulcanizing of the first obtained rubber deposit can be again dipped into the aqueous dispersion. The dippings may be repeated as desired.

The expression "rubber" is intended for the purpose of this invention to include gutta-percha, balata and other analogous vegetable resins.

Various modifications may be made by those skilled in the art without departing from the invention as defined in the appended claim.

What I claim is:

A process of coating a fabric glove with rubber from aqueous dispersion, which comprises wetting said glove with a volatile coagulant of the class consisting of alcohol, formaldehyde and acetone and dipping it into an aqueous dispersion of rubber.

GEOFFREY WILLIAM TROBRIDGE.